(12) United States Patent
Mendonsa et al.

(10) Patent No.: US 9,830,944 B1
(45) Date of Patent: Nov. 28, 2017

(54) WRITING ADJACENT TRACKS WITH DIFFERENT WIDTHS BY VARYING FLY HEIGHT OF A RECORDING HEAD

(71) Applicant: Seagate Technology LLC, Cupertino, CA (US)

(72) Inventors: Riyan Mendonsa, Minneapolis, MN (US); Christopher J. Rea, Edina, MN (US); Stephanie Hernandez, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/040,692

(22) Filed: Feb. 10, 2016

(51) Int. Cl.
| G11B 11/00 | (2006.01) |
| G11B 20/12 | (2006.01) |
| G11B 5/60 | (2006.01) |
| G11B 5/00 | (2006.01) |
| G11B 11/105 | (2006.01) |
| G11B 7/126 | (2012.01) |

(52) U.S. Cl.
CPC ........ G11B 20/1217 (2013.01); G11B 5/6011 (2013.01); G11B 5/6088 (2013.01); G11B 7/126 (2013.01); G11B 11/105 (2013.01); G11B 11/10595 (2013.01); G11B 2005/0021 (2013.01); G11B 2020/1238 (2013.01)

(58) Field of Classification Search
None
See application file for complete search history.

(56) References Cited

U.S. PATENT DOCUMENTS

| 6,405,277 | B1* | 6/2002 | Jen ........................ G06F 13/426 370/487 |
| 8,300,345 | B2 | 10/2012 | Carson |
| 8,842,503 | B1 | 9/2014 | Rausch et al. |
| 8,976,633 | B1* | 3/2015 | Ruan ...................... G11B 5/607 360/55 |
| 9,099,103 | B1 | 8/2015 | Krichevsky |
| 9,324,362 | B1* | 4/2016 | Gao .................... G11B 20/1833 369/13.26 |
| 9,472,212 | B2* | 10/2016 | Ma ........................ G11B 7/1263 369/13.26 |
| 9,508,370 | B1* | 11/2016 | Zhu .................... G11B 5/59627 |
| 9,570,104 | B1* | 2/2017 | Erden ............... G11B 20/10009 |
| 9,607,641 | B1* | 3/2017 | Ramakrishnan ..... G11B 5/6005 |
| 2016/0148636 | A1* | 5/2016 | Ma .......................... G11B 5/09 369/13.26 |
| 2016/0148637 | A1* | 5/2016 | Rausch .................... G11B 5/09 369/13.26 |
| 2016/0148641 | A1* | 5/2016 | Gao ........................ G11B 5/09 369/13.35 |
| 2016/0148642 | A1* | 5/2016 | Gao ........................ G11B 5/09 360/48 |

(Continued)

Primary Examiner — Tan X Dinh
(74) Attorney, Agent, or Firm — Hollingsworth Davis, LLC

(57) ABSTRACT

First and second nominal head-to-media spacings of a magnetic recording head are determined that result in tracks being written to a magnetic recording medium at respective narrower and wider tracks widths. Three or more adjacent tracks of user data are written to the magnetic recording medium using one of the first and second nominal head-to-media spacings so that the adjacent tracks alternate between the narrower and wider track widths.

20 Claims, 6 Drawing Sheets

(56) References Cited

U.S. PATENT DOCUMENTS

2016/0148643 A1* 5/2016 Gao .................. G11B 20/1217
  369/13.33
2016/0148644 A1* 5/2016 Zhu .................. G11B 20/1217
  360/48

* cited by examiner

WRITING ADJACENT TRACKS WITH DIFFERENT WIDTHS BY VARYING FLY HEIGHT OF A RECORDING HEAD

SUMMARY

The present disclosure is directed to writing adjacent tracks with different widths (e.g., interleaved tracks) by varying head-to-media spacing (HMS) of a recording head. In one embodiment, first and second nominal head-to-media spacings of a magnetic recording head are determined that result in tracks being written to a magnetic recording medium at respective narrower and wider tracks widths. Three or more adjacent tracks of user data are written to the magnetic recording medium using one of the first and second nominal head-to-media spacings so that the adjacent tracks alternate between the narrower and wider track widths.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to writing of tracks of different width, such as used in interleaved magnetic recording (IMR). An IMR device uses tracks of different widths to write data in an interleaved fashion, e.g., narrower tracks interleaved between wider tracks. An IMR drive may utilize a head with two write transducers that each write different track widths, e.g., due to different write pole widths, different field strength, etc. In other embodiments, a heat-assisted magnetic recording (HAMR) head and recording media may be able to write different track widths using only a single transducer. These embodiments may also be used by non-HAMR, perpendicular recording heads and media.

Heat-assisted magnetic recording, also referred to as energy-assisted magnetic recording (EAMR), thermally-assisted magnetic recording (TAMR), and thermally-assisted recording (TAR), uses an energy source such as a laser to heat a small spot on a recording medium (e.g., magnetic disk) during recording. The heat lowers magnetic coercivity at the hot spot, allowing a write transducer to change magnetic orientation. Due to the relatively high coercivity of the recording medium after cooling, the data is less susceptible to paramagnetic effects that can lead to data errors.

In order to change the track width using a HAMR head, the laser power may be changed for a different track. This results in a larger or smaller hot spot, thereby affecting the width of the written data. However, changes in laser current may affect the reliability of a HAMR head, e.g., due to higher power levels resulting in significant heating of optical components, increase in thermal protrusion and the air-bearing surface, etc. In other cases, if overall power is reduced, the data written at the narrow track width (corresponding to lower laser power) may exhibit increases in bit error rate (BER). Although write coil current may be changed instead of laser power, this may not provide sufficient range in track widths.

In embodiments described below, the dynamic head-to-media spacing (HMS) is changed in order to vary track widths. Changes in HMS may affect both the size of the HAMR hotspot as well as the strength of the magnetic write field. Use of varying HMS can provide a range of track width options and resolution with minimum impact on BER. This approach can be used with any magnetic read/write head (e.g., perpendicular magnetic recording) and is not limited to HAMR. For purposes of illustration and not limitation, examples below are illustrated in the context of HAMR recording.

Figure 1:
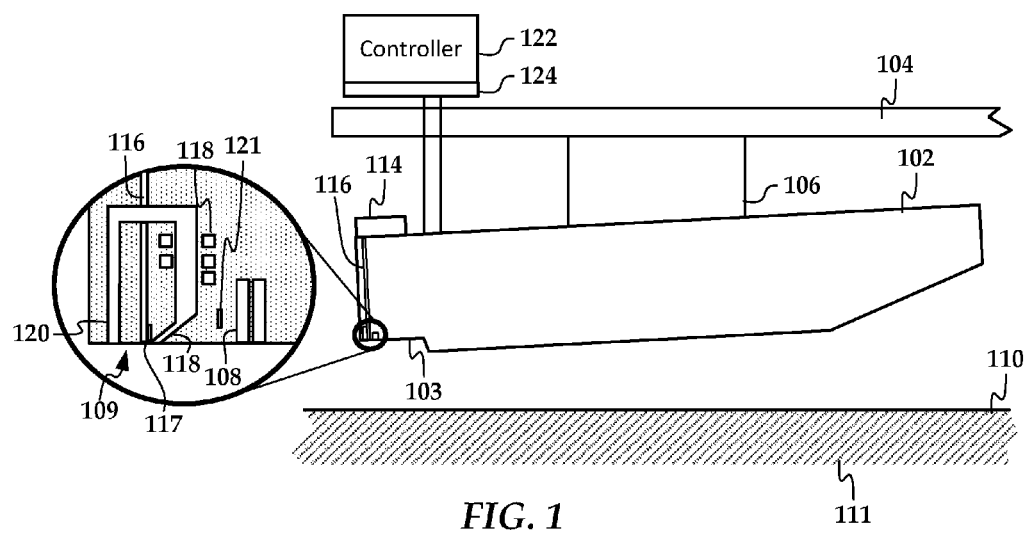
FIG. 1 is a block diagram of a hard drive slider and media arrangement according to an example embodiment.

The block diagram of FIG. 1 shows a HAMR read/write head 102 according to an example embodiment. The read/write head 102 may be used in a HAMR data storage device, e.g., HAMR magnetic hard disk drive (HDD). The read/write head 102 may also be referred to herein as a slider, read head, recording head, write head, etc. The read/write head 102 is coupled to an arm 104 by way of a suspension 106, e.g., a gimbal. The read/write head 102 includes at least one read transducer 108 and at least one write transducer 109 at a media-facing surface 103 (e.g., air-bearing surface, or ABS). The transducers 108, 109 are held proximate to a surface 110 of a magnetic recording medium 111, e.g., magnetic disk.

The read/write head 102 includes a laser 114 coupled to an optical path 116 integrated into the read/write head 102. The optical path 116 delivers energy to a near-field transducer 117 that is part of the write transducer 109. The near-field transducer 117 achieves surface plasmon resonance in response to the optical energy, and directs the surface plasmons to heat a surface of the recording medium 111 when recording data. The write transducer 109 also includes a write coil 118, write pole 119, and return pole 120. While the recording medium 111 is being heated, the write coil 118 is energized to create a magnetic field that is directed to the recording medium via a respective write pole 119 and return pole 120.

The read/write head 102 includes one or more fly-height actuator 121 (e.g., heater) proximate the read and write transducers 108, 109. Electrical power is applied to the fly-height actuator 121, causing a local protrusion at the media facing surface 103. By varying the power, the protrusion can be controlled to set a desired separation between the transducers 108, 109 and the media surface 110. While embodiments below describe heater-type fly-height actuators, the concepts may be applicable to other types of actuators, e.g., mechanical, piezoelectric, etc. A sensor (not shown) may be included to detect a local temperate and be used for feedback control of the heater 121. For example, a resistive material with a known temperature coefficient of resistance can be used to detect temperature for HMS control and other purposes.

A controller 122 includes logic circuits that control current supplied to the laser 114, as well controlling the as sending and receiving of signals to and from the recording head. Those signals include read and write channel data from the transducers 108, 109 and adaptive fly height signals sent to the fly height actuator 121. The signals processed by the controller 122 may also include sensor signals such as photodetectors, temperature sensors, etc. An interface 124 conditions the signals between the controller 120 and the read/write head, performing pre-amplification, filtering, analog-to-digital conversion, digital-to-analog conversion, encoding, decoding, etc.

Figure 2:
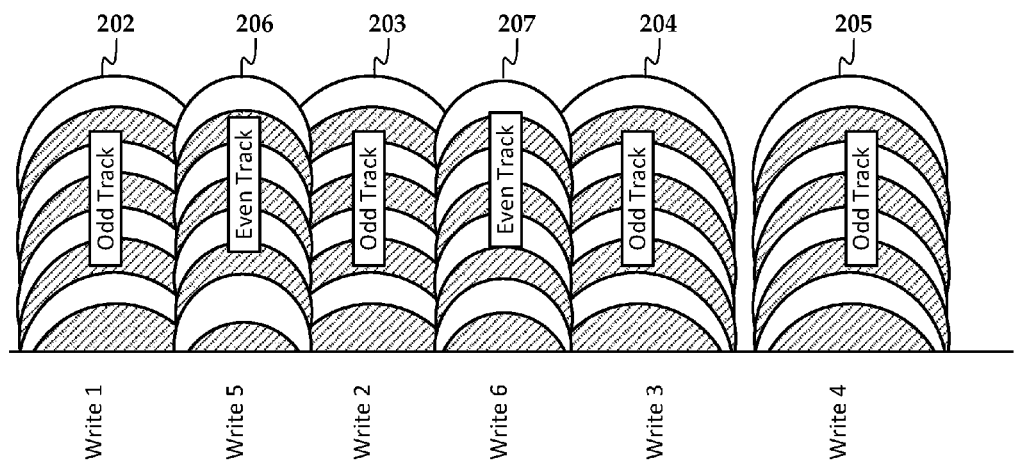
FIG. 2 is a diagram of interleaved tracks according to an example embodiment.

In embodiments described below, a power applied to the fly height actuator 121 is varied to change head-to-media spacing, which in turn can change track width. This variation of power can be in addition to other HMS adjustments, e.g., to compensate for asperities of the media surface 110. The different track widths can be used to interleave tracks of different width in an IMR device. In FIG. 2, a diagram illustrates interleaved tracks according to an example embodiment. Tracks 202-205 are wider tracks, and are arbitrarily designated as odd tracks in this figure. Narrower tracks 206-207 are arbitrarily designated as even tracks, and are interleaved between the wider, odd tracks 202-205. As indicated by the designations below the tracks 202-205 (e.g., Write 1), the odd tracks 202-205 are written first, and the even tracks 206-207 are written next, at least partially overlaying edges of the wider, odd tracks 202-205.

Figure 5:
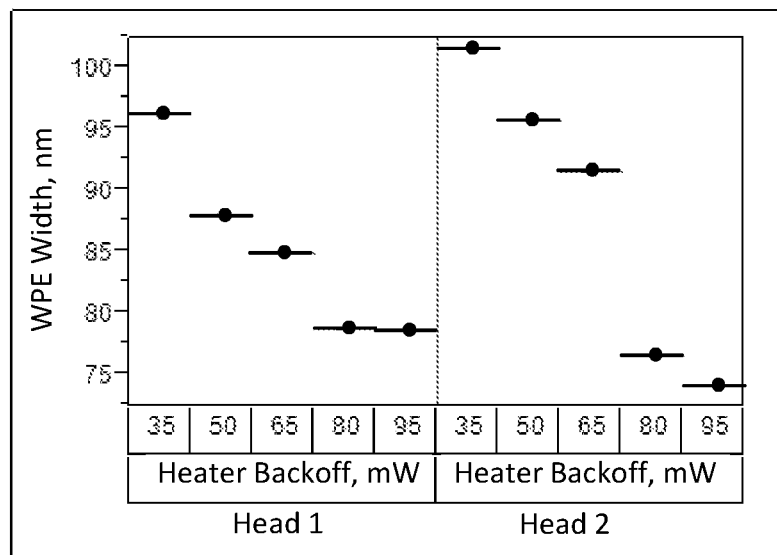

In order to write an interleaved pattern such as shown in FIG. 5, a servo controller can first be instructed to write a block of data along every other track center to write the odd tracks while the HMS is adjusted to write a wide track. The process is repeated for the narrower tracks, e.g., a first of the narrower tracks is written between two wider tracks using the appropriate HMS adjustment, and the servo thereafter writes along every other track center.

Figure 3:
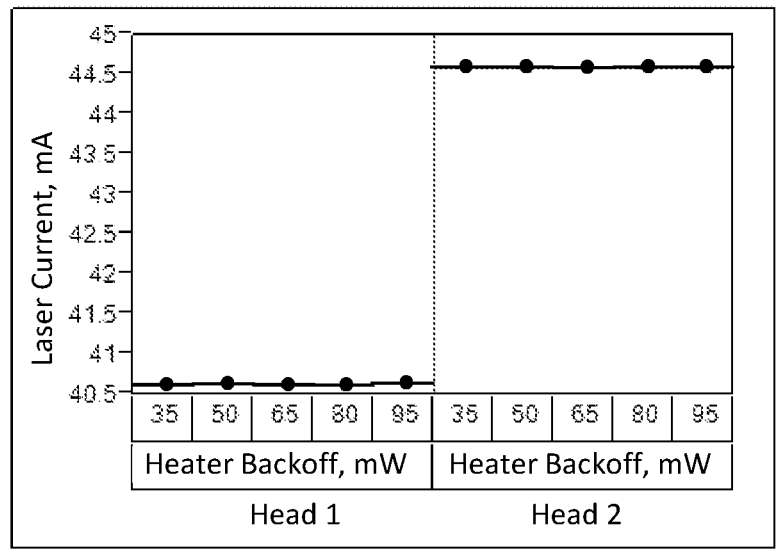
FIGS. 3-6 are graphs illustrating the effects that varying fly height has on various track parameters according to an example embodiment.
Figure 4:
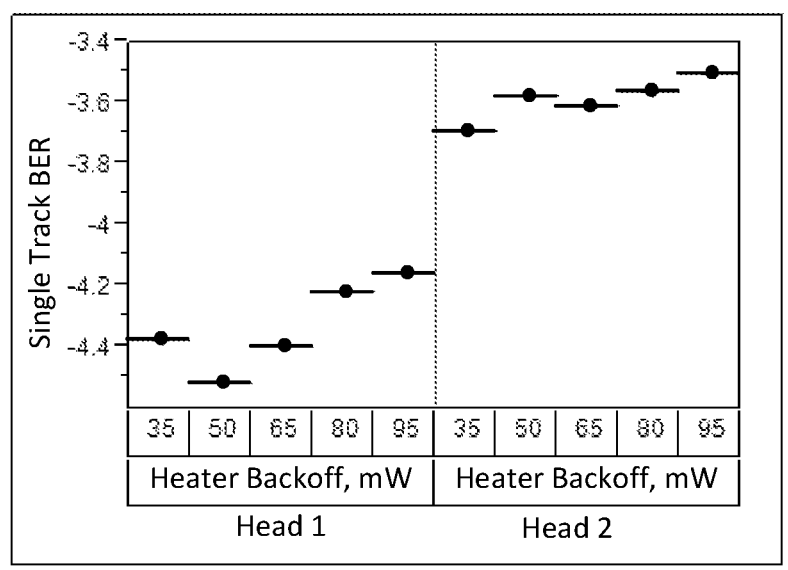
Figure 6:
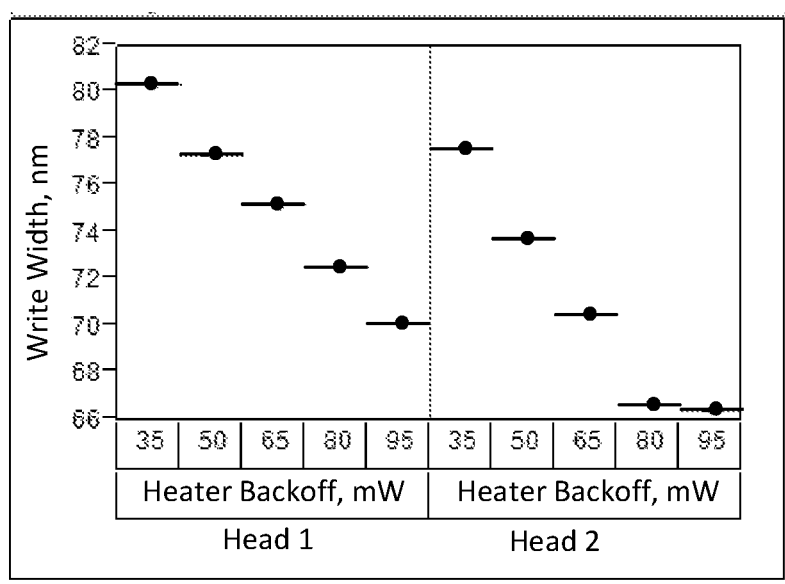

In FIGS. 3-6, graphs illustrate the effects that varying HMS has on various track parameters according to an example embodiment. The data in these graphs was collected from two different HAMR read/write heads. In these figures, the indicated heater back-off power is an adjustment to a baseline heater power. The baseline heater power is used to obtain a known clearance, e.g., a 2 nm clearance. In FIG. 3, a graph shows that for different heater powers, the laser current was held relatively constant. In FIG. 4, a graph shows single track BER measured for the indicated heater power backoff and respective laser currents shown in FIG. 3. In FIG. 5, the write width measured using write-plus-erase (WPE) is shown for the indicated heater powers. In FIG. 6, write width measured using a track scan is shown as a function of heater backoff power.

Figure 7:
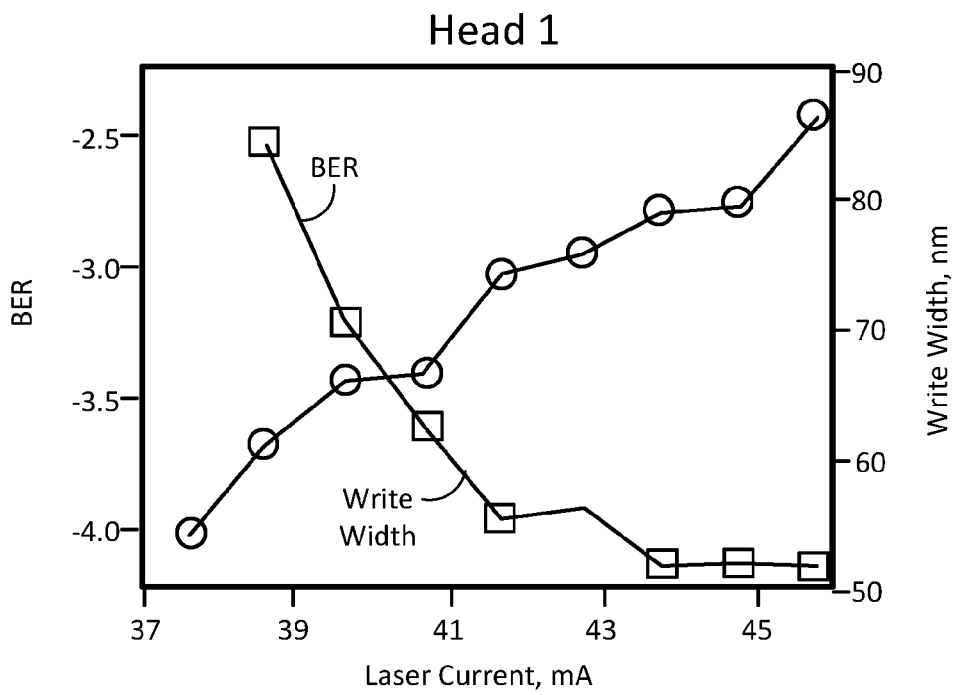
FIGS. 7 and 8 are graphs showing measurements of single track bit error rate and track width for the same heads used to obtain the data of FIGS. 4-6.
Figure 8:
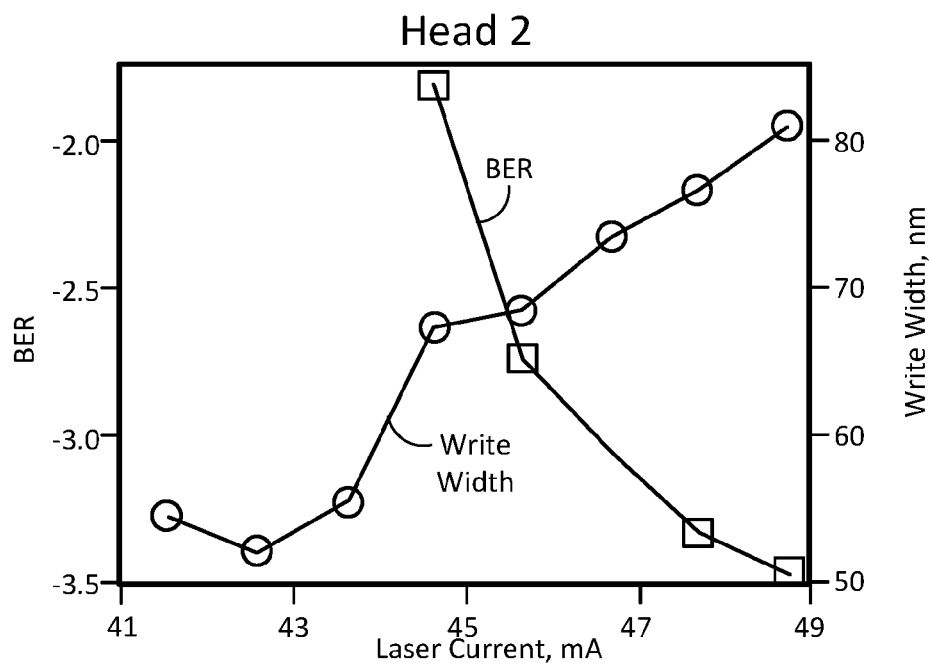

As can be seen from FIGS. 5 and 6, there is a significant change in track width to HMS, around a 1.5:1 ratio. There is a change in BER as seen in FIG. 4, however this is not as severe a penalty as changing laser power to achieve a change in track width. This can be seen in FIGS. 7 and 8, which are measurements of single track BER and track width for the same heads used to obtain the data of FIGS. 4-6. In FIG. 7, a change in write width from about 85 nm to about 65 nm incurs an approximately ten times increase in BER (about −4.3 to about −3.3). In FIG. 8, a smaller change in write width in FIG. 8 (from about 81 nm to about 67 nm) results in an even larger increase in BER (from −3.5 to about −1.8). In contrast, the largest change in BER for Head 1 over the 35-95 mW heater power range as seen in FIG. 4 is from about −4.5 to about −4.25. This corresponds to an 18 nm to 10 nm change in track width depending on the measurement technique used as shown in FIGS. 5 and 6. Head 2 shows an even larger change in track width and lower change in BER for the same heater power range.

By using a fly height actuator to change written track width, the laser power can be kept at a constant nominal power level while recording both wider and narrow tracks. During operation, laser power may be continually adjusted by a control circuit, e.g., to compensate for thermal effects and other environmental changes/disturbances. Nonetheless, the control system will attempt to keep the energy applied to a recording medium within a target range. The laser power used to apply this target range of energy will be considered nominally constant. In some embodiments, a change in clearance may be accompanied by a change in nominal laser current to further increase the available track width range. This may be head-specific. For example, as seen in FIG. 7, the slope of BER is relatively small in the 42-46 mA range, and changes in this range can be applied in combination with changes in heater power to affect a track width change.

Similar to laser power, the range of power applied to a write transducer (e.g., write coil) can be held in a nominally constant range while writing both narrower and wider tracks. The write transducer causes magnetic transitions by changing a direction of magnetic flux applied to the recording medium. The electrical current will therefore be continually changing levels based on the data being written, but will generally be held within a predetermined current range, e.g., −x to +y mA, where x and y are respective negative and positive peak current values. These peak values may be changed in some cases, e.g., to compensate for temperature, asymmetry, etc., but will generally be held within a nominally constant range. In some embodiments, the peak current values may be changed for the different track widths, e.g., to compensate for changes in HMS.

Figure 9:
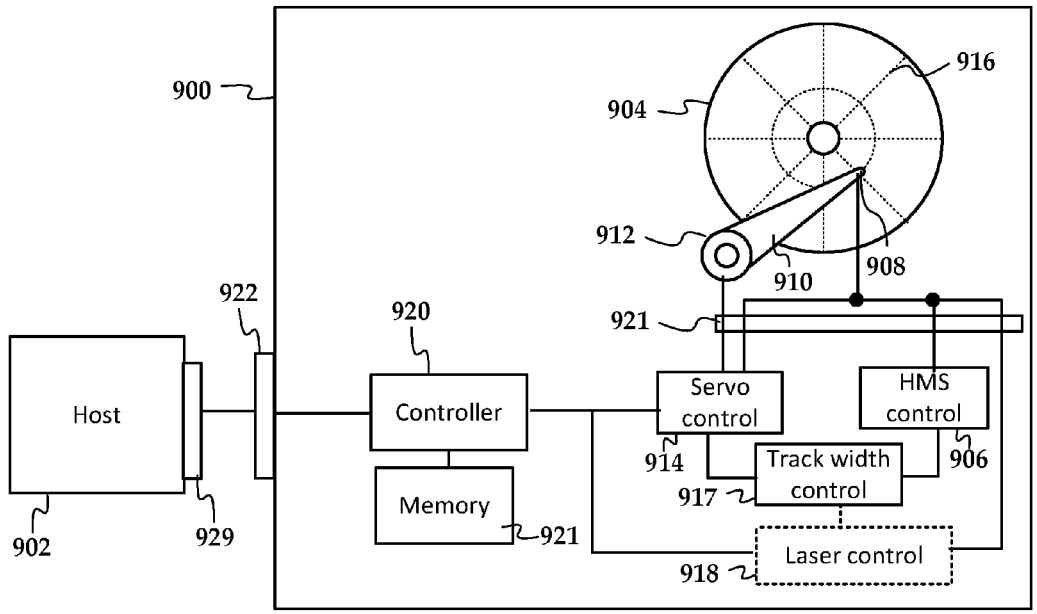
FIG. 9 is a block diagram of a hard disk apparatus according to an example embodiment.

In reference now to FIG. 9, a block diagram illustrates a hard drive apparatus 900 according to an example embodiment. The hard drive 900 includes a magnetic disk 904 used as a recording media. One or more read/write heads 908 are mounted to an arm 910 that is driven radially via a voice coil motor 912 and optionally via a microactuator (not shown). A servo controller 914 reads servo marks 916 on the disk 904 via the read/write heads 908. The servo marks 916 facilitate locating where (e.g., which track) the read/write heads 908 are located.

An HMS controller 906 sends activation currents to one or more fly-height actuators on the read/write heads 908. The fly-height actuators (e.g., resistive heaters) cause localized protrusions near transducers of the read/write heads 908, thereby varying a head-to-media spacing during read/write operations. The HMS controller 906 may activate multiple fly-height actuators (e.g., read heater, write heater), may sense protrusion (e.g., via thermal sensors) and may also compensate for other sources of thermal protrusion (e.g., write transducer, optical components).

The hard drive 900 may be configured as a HAMR drive, in which case a laser controller 918 provides signals to energy sources (e.g., laser diodes) of the read/write heads 908. The energy source heats the magnetic disk 904 during write operations in response to the signals. The laser controller 918 may obtain feedback from sensors located on the read/write heads 908 or elsewhere, such as photodiodes, thermal sensors, etc.

A track width controller 917 is a functional component/module that facilitates writing interleaved tracks of different widths on the disk 904. Generally, the controller 917 coordinates with the servo controller 914 and HMS controller 906 to write alternating tracks of differing width. For example the servo controller 914 may first write a first portion of data (e.g., a sequential stream of data) to alternating first tracks having a wide width, then write a second portion of the data to second, narrower width tracks between the first, wide tracks. The track width controller 917 may optionally alter laser power for the different widths via laser controller 918.

A system controller 920 provides high-level control of operations of the hard drive device 904, including laser, HMS, track width, and servo control. The controller 920 may facilitate operations of other components not shown, such as read/write channels, disk motor control, power distribution, etc. Generally, interface circuitry 921 facilitates communications between the various controllers and other electrical components (e.g., voice coil motor 912, read/write heads 908). Such circuitry 921 may include, but is not limited to preamplifiers, amplifiers, filters, analog-to-digital converters, digital-to-analog converters, power supplies, encoders, decoders, read/write channels, etc.

The hard drive device 904 includes a host interface 922 for communicating with external devices, such as a host 902. The host 902 may include conventional computing hardware, such as a processor 924, memory 926, and input/output (I/O) circuitry 928. The host 902 includes an interface 929 that may provide electrical and mechanical coupling to the hard drive device 904.

Figure 10:
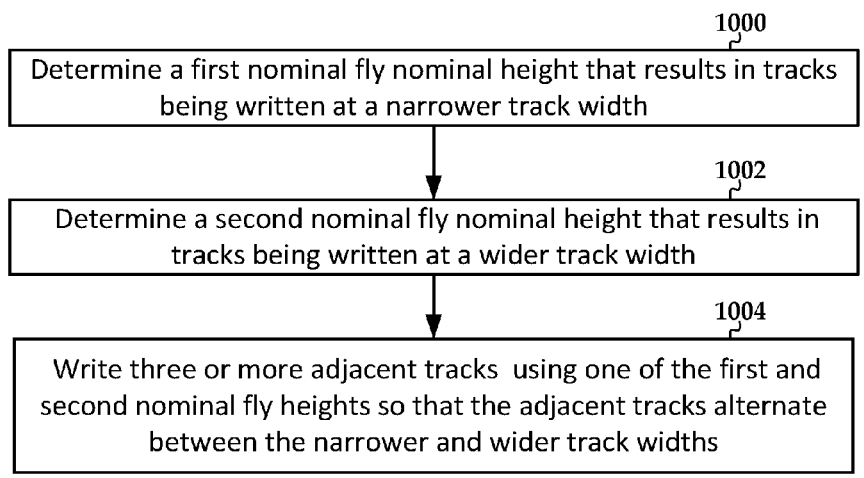
FIGS. 10 and 11 are flowcharts of methods according to example embodiments.

In FIG. 10, a flowchart illustrates a method according to an example embodiment The method involves determining 1000, 1002 first and second nominal head-to-media spacings of a magnetic recording head that result in tracks being written to a magnetic recording medium at respective narrower and wider track widths. Three or more adjacent tracks of user data to the magnetic recording medium are written 1004 using one of the first and second nominal HMS so that the adjacent tracks alternate between the narrower and wider track widths.

Figure 11:
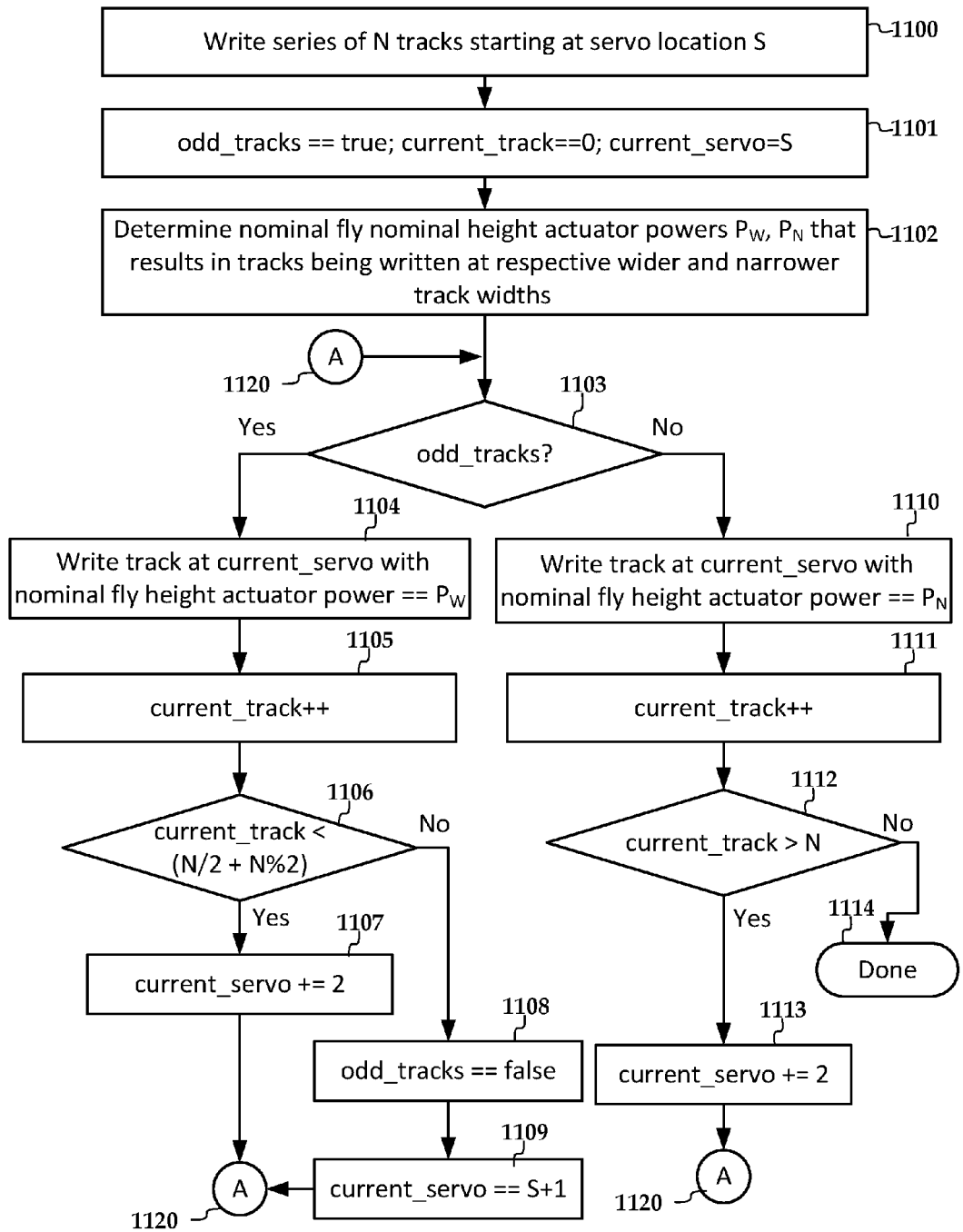

In FIG. 11, a flowchart illustrates a method according to another example embodiment. The method is a simplified example of how a system may respond to a request 1100 for writing a series of N-tracks at a starting servo location S (e.g., starting track ID). Local variables are initialized at block 1101 and actuator powers $P_W$, $P_N$ are determined at block 1102 that result in respectively wider and narrow tracks being written. In this example, the odd tracks are written first and at the wider track width, however in other embodiments this may apply to the even tracks instead. The HMS determined at block 1102 may have been previously determined and are stored in memory, and may be based on a function that varies according to ambient temperature, current zone of the recording medium, etc.

Block 1103 represents the entry of a loop in which each individual track is written, the loop beginning by testing the local Boolean variable odd_tracks. The odd_tracks variable will remain 'true' for the first N/2 tracks (if N is even) or N/2+1 (if N is odd) in this example. For the odd tracks (block 1103 returns 'yes'), the current track is written at current_servo at using fly height actuator power $P_W$, as indicated at block 1104. This results in a wide track being written. The current_track variable is incremented 1105 and tested at block 1106 to determine if this is the last odd track. If this is not the last odd track (block 1106 returns 'yes'), the current_servo is incremented by two (to skip the adjacent track center) and the loop continues via block 1120.

Note that if N is odd, block 1106 will return 'no' when current_track is equal to N/2, but if N is even, will return 'no' when current_track is equal to N/2−1. This ensures that there are more wide tracks written than narrow tracks. For example, using integer arithmetic, if N=5, N/2+N %2=2+1=3. So, block will return 'yes' for tracks 0, 1, 2, which will be written as wide tracks at servo locations S, S+2, and S+4. As will be shown below, the remaining, even tracks 3 and 4 will be written as narrow tracks at S+1 and S+3, thus interleaving the narrow tracks between the wide tracks.

If it is determined at block 1106 that this is the last odd track (block 1106 returns 'no'), the odd_tracks variable is set to 'false' at block 1108. The current_servo variable is set to S+1 at block 1109, which will begin writing the even tracks just after the first wide track which was written at S. For the even tracks (block 1103 returns 'no'), the current track is written at current_servo at using fly height actuator power $P_N$, as indicated at block 1110. This results in a narrow track being written. The current_track variable is incremented 1111 and tested at block 1112 to determine if this is the last track. If not (block 1106 returns 'yes'), the current_servo is incremented by two (to skip the adjacent track center) and the loop continues via block 1120. The procedure terminates 1114 after the last track is written.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining first and second nominal power levels applied to a fly height actuator of a magnetic recording head that result in tracks being written to a magnetic recording medium at respective narrower and wider track widths; and
   writing three or more adjacent tracks of user data to the magnetic recording medium using one of the first and second nominal power levels applied to the fly height actuator so that the adjacent tracks alternate between the narrower and wider track widths.

2. The method of claim 1, wherein the magnetic recording medium comprises a heat-assisted recording medium.

3. The method of claim 2, wherein a constant nominal laser power is applied to a laser of the magnetic recording head when writing all of the adjacent tracks.

4. The method of claim 2, wherein a first and second nominal laser power is applied to a laser of the magnetic recording head when writing tracks of the respective narrower and wider track widths.

5. The method of claim 1, wherein writing the three or more tracks comprises interlaced magnetic recording wherein first tracks are written having the wider track width, and second tracks having the narrower track width are written between the first tracks.

6. The method of claim 1, wherein a current applied to a write coil of the magnetic recording head is held within a nominally constant range when writing all of the adjacent tracks.

7. The method of claim 1, wherein the fly height actuator comprises a heater of the magnetic recording head.

8. An apparatus comprising:
   interface circuitry configured to communicate with a read/write head, the read write head comprising a fly height actuator; and
   a controller configured to:
      determine first and second nominal power levels applied to the fly height actuator that result in tracks being written to a magnetic recording medium at respective narrower and wider track widths; and
      apply the first and second nominal power levels to the fly-height actuator while writing three or more adjacent tracks of user data to the magnetic recording medium so that the adjacent tracks alternate between the narrower and wider track widths.

9. The apparatus of claim 8, wherein the magnetic recording medium comprises a heat-assisted recording medium.

10. The apparatus of claim 9, wherein the controller is configured to apply a constant nominal laser power to a laser of the read/write head when writing all of the adjacent tracks.

11. The apparatus of claim 9, wherein the controller is configured to apply a first and second nominal laser power to a laser of the read/write head when writing tracks of the respective narrower and wider track widths.

12. The apparatus of claim 8, wherein writing the three or more tracks comprises interlaced magnetic recording wherein first tracks are written having the wider track width, and second tracks having the narrower track width are written between the first tracks.

13. The apparatus of claim 8, wherein the controller is configured to apply a current to a write coil of the read/write head is held, the current held within a nominally constant range when writing all of the adjacent tracks.

14. The apparatus of claim 8, wherein the fly height actuator comprises a resistive heater.

15. A system comprising:
   a magnetic recording medium;
   a magnetic recording head comprising a fly height actuator, the magnetic recording head configured to write to the magnetic recording medium; and
   a controller coupled to the magnetic recording head and configure to:
      determine first and second nominal power levels applied to the fly height actuator that result in tracks being written to the magnetic recording medium at respective narrower and wider track widths; and
      apply the first and second nominal power levels to the fly-height actuator while writing three or more adjacent tracks of user data to the magnetic recording medium so that the adjacent tracks alternate between the narrower and wider track widths.

16. The system of claim 15, wherein the magnetic recording medium comprises a heat-assisted recording medium and wherein the magnetic recording head further comprises a laser configure to heat the heat-assisted recording medium when writing the tracks.

17. The system of claim 16, wherein the controller is configured to apply a constant nominal laser power to the laser when writing all of the adjacent tracks.

18. The system of claim 16, wherein the controller is configured to apply a first and second nominal laser power to a laser of the read/write head when writing tracks of the respective narrower and wider track widths.

19. The system of claim 16, wherein the controller is configured to apply a current to a write coil of the magnetic recording head, the current held within a nominally constant range when writing all of the adjacent tracks.

20. The system of claim 15, wherein writing the three or more tracks comprises interlaced magnetic recording wherein first tracks are written having the wider track width, and second tracks having the narrower track width are written between the first tracks.

* * * * *